S. H. COYNE.
TROLLEY DEVICE.
APPLICATION FILED JULY 12, 1907.

1,118,105.

Patented Nov. 24, 1914.
2 SHEETS—SHEET 1.

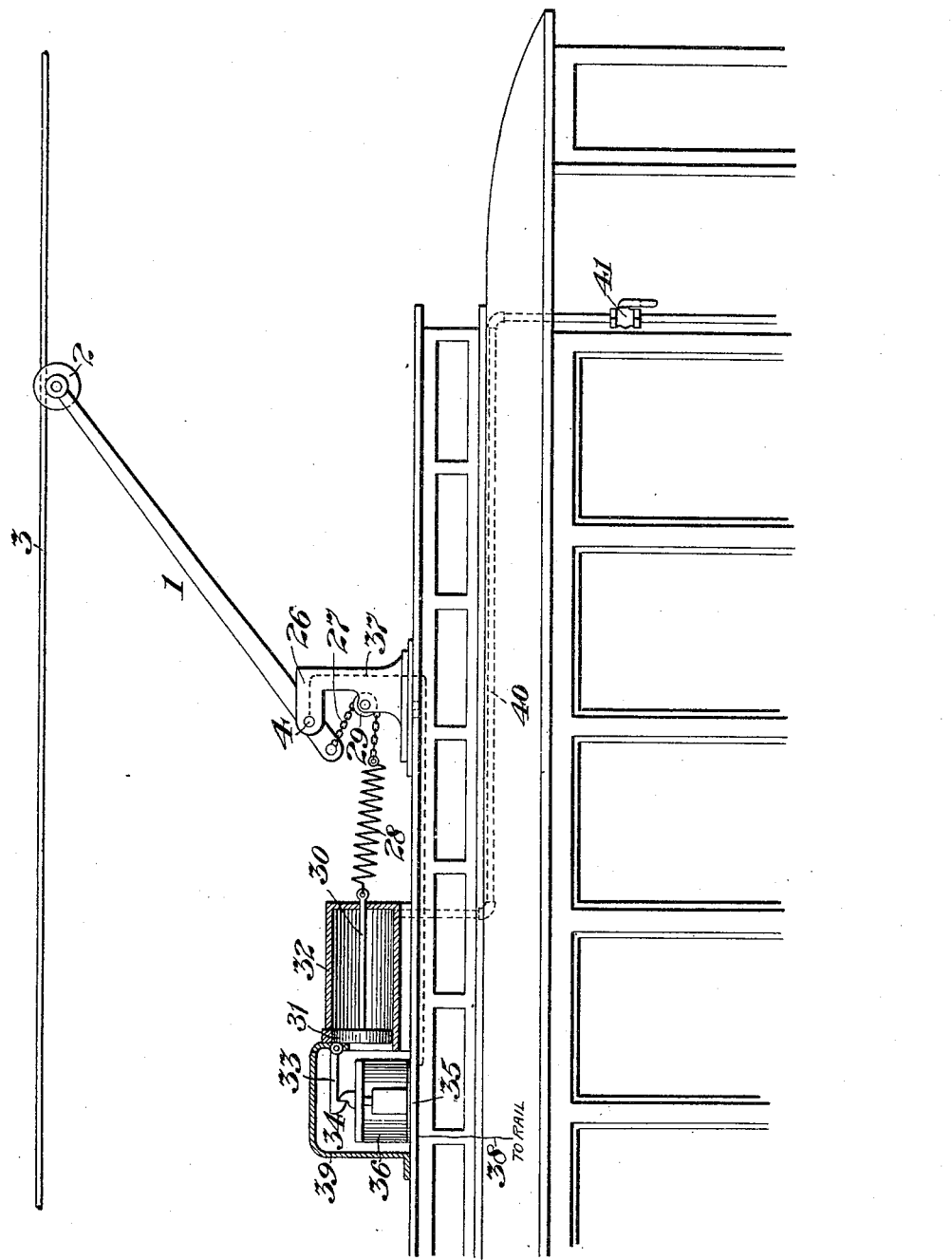

UNITED STATES PATENT OFFICE.

STEPHEN H. COYNE, OF SYRACUSE, NEW YORK, ASSIGNOR TO WESTINGHOUSE ELECTRIC & MANUFACTURING COMPANY, A CORPORATION OF PENNSYLVANIA.

TROLLEY DEVICE.

1,118,105.  Specification of Letters Patent.  Patented Nov. 24, 1914.

Application filed July 12, 1907. Serial No. 383,427.

*To all whom it may concern:*

Be it known that I, STEPHEN H. COYNE, a citizen of the United States, and resident of Syracuse, county of Onondaga, State of New York, have invented certain new and and useful Improvements in Trolley Devices, of which the following is a specification.

My invention relates to means for raising a trolley pole into operative position and for lowering the same automatically when the trolley goes out of contact with the trolley wire.

The means employed for raising the pole, as illustrated herein, are pneumatic and the means for holding the pole to its work and for releasing the pole when a rupture of contact takes place between the trolley and the trolley wire, are electromagnetic. Roughly speaking the arrangement is such that the trolley pole is lifted by being operatively connected with a piston capable of being moved by air pressure within a cylinder until contact is made with the trolley and the trolley wire, such a movement of the piston being sufficient to carry a latch or hook into a proper position for engagement with a corresponding catch or hook which catch or hook is immediately brought into engagement with the latch or hook carried by the piston so as to hold the trolley pole to its work. Upon a disengagement of the trolley from the trolley wire, the magnet or solenoid, which is located in a shunt around the driving motor is deënergized, releases the catch or hook, and allows the trolley pole to fall to a horizontal position or to the roof of the car.

My invention is illustrated in the accompanying drawings, in which—

Figure 1:
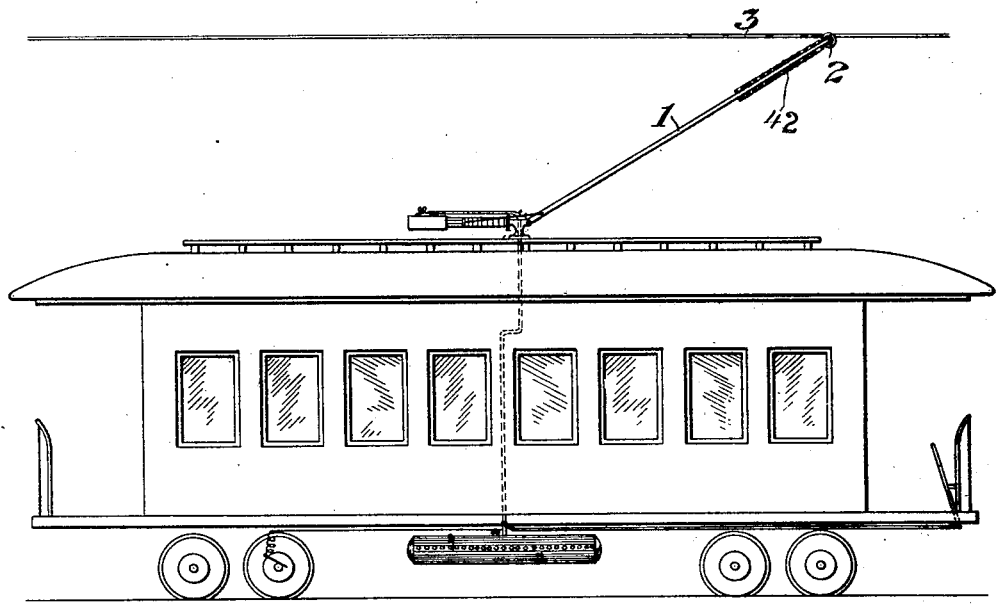
Figure 2:
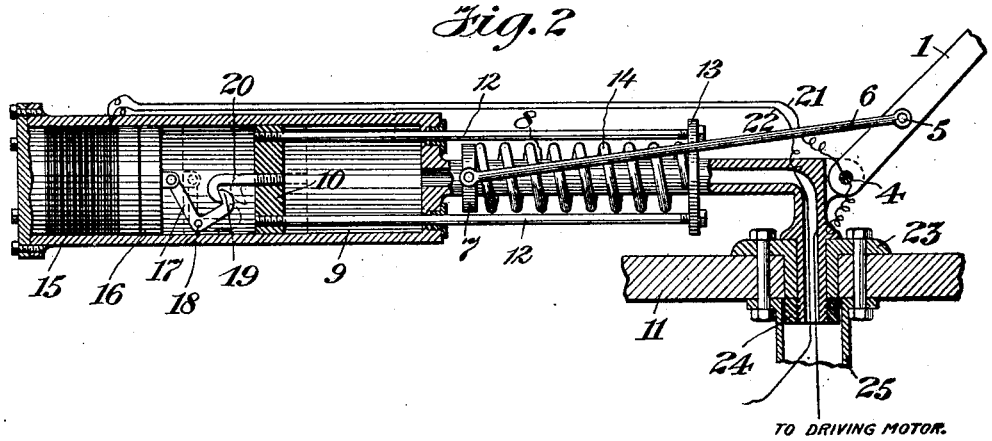

Figure 1 is a side elevation of a car having my improved trolley device applied thereto; Fig. 2 is a sectional view of the main operating features of the device; and Fig. 3 is a side elevation of a portion of a car having applied thereto a modification of the device shown in Figs. 1 and 2.

Referring to the first two figures of the drawing, 1 is a trolley pole carrying at its outer extremity a trolley, 2, adapted to engage with a trolley wire, 3. The trolley pole is pivoted at 4 and is connected at 5 by means of a connecting rod, 6, with a collar, 7, loosely mounted on a pipe or tube, 8, adapted to convey air under pressure to a cylinder, 9. Within the cylinder is a piston, 10, connected by piston rods, 12, to a head, 13, between which head and the collar 7 is located a spiral spring, 14. The spring 14 is compressed by the weight of the trolley arm acting through the rod 6 and collar 7 whenever the piston 10 is pushed into the cylinder by air pressure and when the pressure is removed, the spring tends to throw the piston and the parts connected therewith outward thus lowering the trolley pole 1, unless special means are provided for holding the piston in its innermost position. The pneumatic pressure is removed after the latch 20 and catch 19 are in engagement by shutting off the air supply in any usual well-known manner. Such means are provided by a magnet or solenoid, 15, shown in Fig. 2 as being provided with an armature, 16, to which is linked an angular lever, 17, pivoted at 18 and provided at its outer end with a hook or catch, 19. To the piston 10 itself is connected a latch or hook 20 adapted to engage with the catch or hook 19 whenever the latter is raised into a position of engagement by the drawing of the armature 16 close to the end of the magnet 15. The said magnet is connected in shunt to the regular motor circuit on the car by means of wires, 21 and 22, the former of which is joined to the trolley pole in any suitable manner and the latter of which may pass into and through the pipe or tube 8 into connection with the rail, being insulated from the pipe or tube by any suitable means.

In operating the device, air is passed under pressure through the tube 8 into the cylinder 9, forcing the piston 10 inward. Thereby the trolley pole is raised and when the trolley at its outer end is brought into contact with the trolley wire, the magnet 15 becomes energized, attracts its armature, and brings the catch or hook 19 into engagement with the latch or hook 20. Thus the trolley is held against the wire and continues to be so held until something occurs to cause an interruption of the circuit of the magnet 15, as when the trolley becomes disengaged from the wire through accident or otherwise. Thereupon the weight of the trolley arm acting through the spring 14 and the latch 20 draws the armature 16 forward and releases the latch from the catch 19. The piston 10 is thus drawn forward by the weight of the trolley arm acting through the spring 14, so that the trolley arm drops.

The tube 8 passes near its outer end through a bushing, 23, and is screw threaded at its extremity to receive a nut, 24. Thereby is provided a swivel joint enabling the trolley device to be shifted end for end, thus dispensing with the necessity for two trolley poles on the car. The pipe 8 then enters a large pipe, 25, through which air is passed to the pipe 8 to perform the operations already described.

Any convenient means may be employed for drawing the armature 16 away from the magnet 15 when the latter is deënergized, as, for instance, the action of the spring 14 may be depended upon to draw the armature away until the points of the engaging hooks pass each other thereby releasing the piston.

It will be seen that the wire or conductor 22 must be flexible in order to perform the shifting of the trolley pole. Fig. 3 illustrates a modification of the apparatus shown in Figs. 1 and 2. Here the trolley arm 1 is supported upon a standard, 26, and instead of being pivoted at or near its extremity is projected beyond the pivoted point 4 and connected by a cord or chain, 27, to a coil spring, 28, the said cord or chain passing over a pulley, 29. The piston rod, 30, is joined to the spring 28 and carries a piston, 31, within a cylinder, 32. A latch or hook, 33, is joined to the inner end of the piston and is in a proper position to engage with a catch, 34, joined to the core, 35, of a solenoid, 36. One terminal of the coil of said solenoid is connected by a wire, 37, (shown in broken lines) to the pivot 4 of the trolley arm 1. The other terminal of the coil is connected by a wire, 38, to the rail. The solenoid 36 is protected by a suitable housing, 39, as shown. Into the cylinder 32 extends a pipe or tube, 40, for conveying compressed air, the inlet of air being controlled by a valve, 41, under the control of an operator on the car platform. The action is generally similar to that already detailed in connection with the descriptions of Figs. 1 and 2.

In order to set the trolley pole, the valve 41 is operated to admit air under pressure to the cylinder 32 for the purpose of forcing the piston 31 inward. The piston, acting through the piston rod 30 upon the spring 28 stretches the said spring and at the same time, by drawing upon the cord or chain 27, depresses the inner end of the trolley arm and lifts the outer end thereof until it makes contact with the trolley wire 3. The solenoid 36 is thus energized drawing up its core 35 and causing the catch 34 to engage with the latch 33. Thus the trolley is held firmly against the trolley wire. When the trolley jumps the wire or is disconnected in anyway, the solenoid 36 is deënergized, the catch 34 drops by gravity, and the weight of the trolley arm acting through the spring 28 asserting itself draws the piston 31 outward and at the same time permits the trolley pole to drop.

It will be desirable in both forms of trolley devices herein shown, to insulate externally the upper end of the trolley pole, so that the magnet 15 or the solenoid 36 as the case may be shall not retain its magnetism by reason of the upper end of the pole remaining accidentally or otherwise in contact with the trolley wire. Such insulation is shown at 42.

I claim as my invention:—

1. The combination with a trolley base, a trolley pole, and a trolley wire or conductor, of pneumatic means for raising the pole into contact with the wire, an electromagnet adapted to be energized by such contact, and a catch operated by the said magnet for retaining the trolley pole in its raised position.

2. The combination with a trolley base, a trolley pole, and a trolley wire or conductor, of pneumatic means for raising the pole into contact with the wire, an electromagnet adapted to be energized by such contact, and a catch operated by the said magnet for retaining the trolley pole in its raised position, the said electromagnet being in shunt to the car motor.

3. The combination with a trolley base and a trolley pole, of an air cylinder, a piston therein, spring connections between said piston and the trolley pole, said connections placing the spring under tension when the piston is forced inward, pneumatic connections for admitting air to the cylinder for operating the piston, an electromagnet, and means for closing a circuit therethrough, and connections between said magnet and the piston serving to hold the piston in its inward position so long as the circuit remains closed.

4. The combination with a trolley base, a trolley pole, and a trolley wire or conductor, of an air cylinder, a piston therein, spring connections between the said piston and the trolley pole, said connections putting the spring under tension when the piston is forced inward, pneumatic connections for admitting air to the cylinder for operating the piston, a catch for holding the piston in its inward position, and electromagnetic means serving upon the disengagement of the trolley from the trolley wire to release the catch and the piston.

5. The combination with a trolley pole and a trolley wire or conductor, of means for raising the trolley pole into contact with the wire, a catch, and an electromagnet for operating the catch which, when energized, holds the trolley pole in its raised position, the circuit of the said electromagnet being controlled by the contact of the trolley pole and the trolley wire.

6. In a trolley pole operating device, an electromagnet and a catch operated thereby, a pneumatically operated piston and a latch connected therewith, devices connecting the piston with the trolley pole, pneumatic means for moving the piston to raise the trolley pole and for bringing the said latch into line for engagement with the said catch, devices operated by the electromagnet, when energized, for causing such engagement, the energization of the said magnet being dependent upon the contact of the trolley pole with the trolley wire.

Signed at Syracuse, in the county of Onondaga, and State of New York, this 10th day of July A. D. 1907.

STEPHEN H. COYNE.

Witnesses:
JOHN G. SAYLES,
EDNA T. MERRIAM.

Copies of this patent may be obtained for five cents each, by addressing the "Commissioner of Patents, Washington, D. C."